No. 808,998. PATENTED JAN. 2, 1906.
C. LOETSCHER.
METHOD OF MANUFACTURING SIDING.
APPLICATION FILED APR. 19, 1904.

WITNESSES:
L. Almquist.
A. C. Kemon

INVENTOR
Christian Loetscher
BY
ATTORNEYS

UNITED STATES PATENT OFFICE.

CHRISTIAN LOETSCHER, OF DUBUQUE, IOWA.

METHOD OF MANUFACTURING SIDING.

No. 808,998. Specification of Letters Patent. Patented Jan. 2, 1906.

Application filed April 19, 1904. Serial No. 203,868.

*To all whom it may concern:*

Be it known that I, CHRISTIAN LOETSCHER, a citizen of the United States, and a resident of Dubuque, in the county of Dubuque and State of Iowa, have invented a new and Improved Method of Manufacturing Siding, of which the following is a full, clear, and exact description.

My invention relates to an improved siding or weather board used for the outside covering of frame buildings and to a method of manufacturing the same.

The objects of my invention are to provide for a more economical production of sidings and at the same time to provide a siding-board having certain points of superiority over those now in use.

The present universal method of manufacturing siding is to first saw the timber or log into boards and then to rip these boards into "strips" of a width of four or six inches. Allowance of one-half inch in width over the finished product is made for shrinkage and waste in working. These strips are then air-seasoned or kiln-dried. They are then run through a planing-machine and dressed on all four sides to a thickness of three-quarters of an inch and a width of five and one-half inches when six-inch stock is employed. After planing the piece is resawed diagonally by a circular saw, so as to make two pieces of finished siding. The faces of the siding formed by this last sawing operation are placed next to the building, and the planed side therefore faces outward when on the building. This system involves a great deal of waste and also exposes defects in planing, such as tearing up the grain of the wood around knotty places, to view and to the weather. These defects also produce the necessity for cutting out rough places and throwing away much material.

Reference is to be had to the accompanying drawings, forming a part of this specification, in which similar characters of reference indicate corresponding parts in all the figures.

Figure 1:
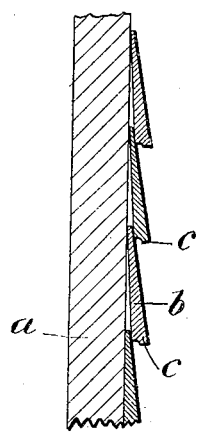
Figure 2:
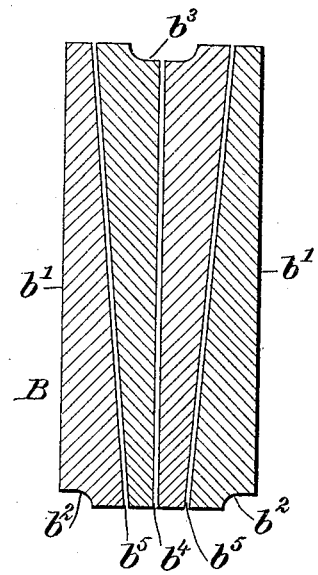
Figure 3:
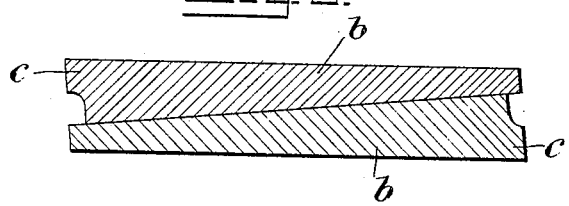
Figure 4:
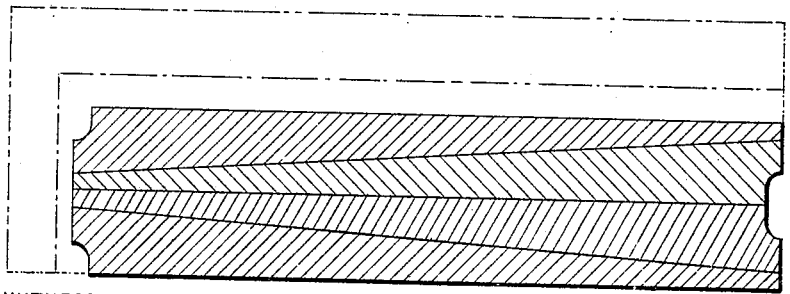

Figure 1 represents a wall of a building with my improved siding applied thereto. Fig. 2 represents a blank showing the saw-kerfs made for producing siding according to my improved method. Fig. 3 represents the manner in which the siding-boards are placed upon a finishing-machine, and Fig. 4 represents diagrammatically the saving secured by my improved method.

My improved method of producing siding, as well as the product thereof, is represented in the drawings. A plank is produced in the ordinary manner; but instead of being one inch thick, as is now the usual custom, it is made an inch and a half thick. The plank is then air-seasoned or kiln-dried before ripping into siding-strips. It will be noticed that quite a saving of material can be effected by this new process of manipulating the blanks B, Fig. 4, as no further allowance will have to be made for shrinkage and the siding-strip can be ripped to almost its finished width. After ripping the plank into blanks of proper width they are run through a molding-machine, forming the two edges $b'$ and providing two corner-grooves $b^2$ on one edge and a central corner-groove $b^3$ on the other edge. In this operation the surplus material from the sides can be removed if the stock should happen to be over an inch and a half thick. The next operation is to resaw the piece with a very thin band-saw or the equivalent thereof into two equal thicknesses, producing a kerf $b^4$. (Indicated in Fig. 2.) After this each of these pieces is again resawed diagonally in a similar manner to that now employed, as shown by the kerfs $b^5$. This will make four pieces of siding each of the thickness now produced by the ordinary method—that is, one-half inch thick on one edge and one-eighth on the other. From this point a further radical departure is made in the finishing of the siding. It will be remembered that in the old form the external sides of the blank, which would be represented in Fig. 2 by the letters $b'$ and $b^4$, as well as the edges, were planed before the diagonal sawing was performed and that these outside sides $b'$ and $b^4$ were used for the exterior of the siding when applied to a building. Now in my process this planing operation is dispensed with, and these surfaces $b'$ and $b^4$ are left as they are produced by means of the saws, and instead of using them for the outside surfaces of the siding I reverse the operation and use the surfaces produced by the kerfs $b^5$ for the outside surfaces. So far these surfaces are left in the condition produced by the band-saw; but for the purpose of finishing them I run them through a machine commonly known as a "sander," in which the stock is passed between parallel feed-rolls and over revolving drums covered with sandpaper. For the purpose of performing this operation without any change in the machine I set two pieces in the manner shown in Fig. 3, so that the bottom surface will be parallel with the top surface and the operation will be performed in the exact manner that would take place if a board with parallel sides were passed through the machine. The advantage of sawing the diagonal cuts in the manner described and using the surfaces so produced for the external surface of the siding will be obvious. The grain is perfectly intact and smooth and except for the fine marks produced by the saw free from all defects, and no bad planer-work can injure it. Also the bruises, dents, &c., which frequently are produced by handling and by manipulation on the planer are avoided.

Particular attention is called to the fact that no planing whatever is done on the outside surfaces of the siding, thus saving all of this work and all of the material ordinarily wasted in planing and at the same time giving a more highly-finished surface without the possibility of defects of workmanship. The material wasted in the sanding process is less than one sixty-fourth of an inch, so that no allowance really has to be made for it. The saving by this process is indicated in Fig. 4, in which the blank B represents the amount of material that I have to use for producing four pieces of siding by my improved method, while the dotted lines in connection with the extreme lower and right-hand shaded lines indicate the amount of material that would have to be used in the old method for producing the same four pieces of siding. My blank is an inch and a half thick by five and five-eighths inches in width, while the blanks used by the old process for producing the same amount of siding are two in number, each one being one inch by six.

In Fig. 1 is represented the wall of a building or stud $a$ and the siding $b$ applied thereto. It will be seen that the grooves (represented in Fig. 2 by $b^2$ and $b^3$) produce projections $c$, which act as overlapping water-conducting drips that prevent the water from running along the lower edge of the siding back to the point of junction between the upper and lower pieces. In the old form the flowing of the water back to this point permitted it to soak into the siding at its unpainted portion and assist in the early decay thereof. In my improved siding the water is compelled to drip from the lower edge $c$, and it cannot pass back to the unpainted portion.

It will thus be seen that my invention is of great practical value and that the method involved results in a great saving both of material and labor and also that an improved product is produced.

Having thus described my invention, I claim as new and desire to secure by Letters Patent—

1. A method of manufacturing siding, consisting in producing a plank, seasoning it, ripping it to form strips, molding a groove in each corner of one edge and a groove in the center of the opposite edge of the strip, and finally cutting the strip into four siding-boards by sawing it in two centrally, the saw-cut extending parallel to the side surfaces of the strip, and sawing each of the halves on a diagonal line, said lines on the two halves converging toward each other.

2. A method of manufacturing siding, consisting in producing a plank, seasoning it, ripping it to form strips, molding a groove in each corner of one edge and a groove in the center of the opposite edge of the strip, and finally cutting the strip into four siding-boards by sawing it in two centrally on a line parallel to the side surfaces of the strip, and bisecting the central groove and sawing each of the halves on a diagonal line from the point near the ungrooved corner of each half to a point near the opposite corner thereof, said diagonal saw-cuts dividing each half into two exactly similar siding-boards.

3. A method of manufacturing siding, consisting in producing a plank by sawing, seasoning the blank, then ripping it to form strips of uniform width, resawing the strips in three directions to make four siding-board blanks, placing two of the blanks thus produced together with their freshly-sawed surfaces outward, and finally finishing said freshly-sawed surfaces.

In testimony whereof I have signed my name to this specification in the presence of two subscribing witnesses.

CHRISTIAN LOETSCHER.

Witnesses:
W. C. S. Coy,
Jas. M. Burch.